Oct. 4, 1938.  T. E. NELSON  2,132,042
OIL SEAL
Filed March 4, 1936
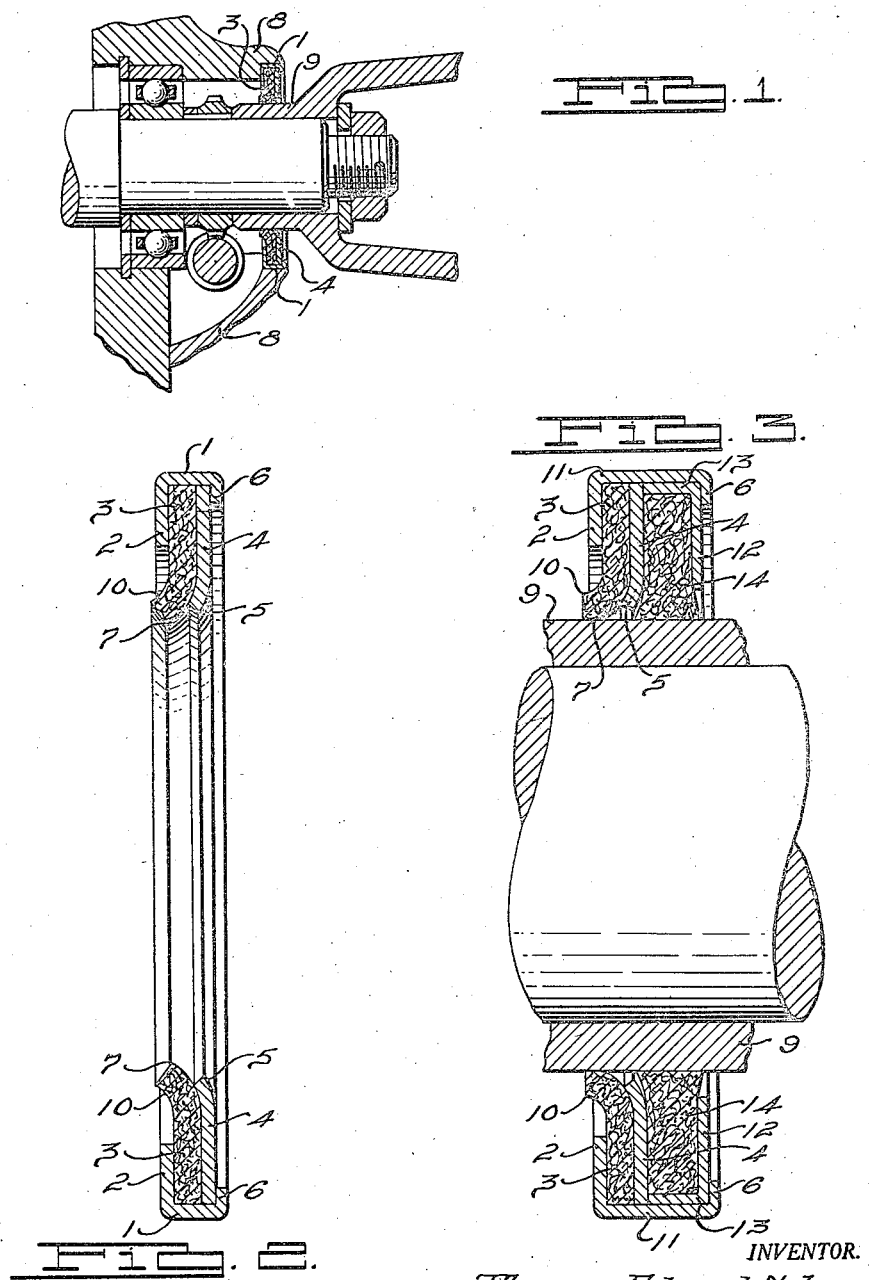
INVENTOR.
Thomas Edward Nelson.
BY
ATTORNEY.

Patented Oct. 4, 1938

2,132,042

UNITED STATES PATENT OFFICE 2,132,042

OIL SEAL

Thomas Edward Nelson, Pontiac, Mich.

Application March 4, 1936, Serial No. 67,009

1 Claim. (Cl. 286—5)

This invention relates to oil seals and the object of the invention is to provide an oil seal adapted to be held in stationary position and having a washer of resilient material through which a rotating shaft may extend, the edge of the washer in contact with the shaft being held in curved position to provide a wiping contact with the shaft.

Another object of the invention is to provide an oil seal comprising a sheet metal retainer in which a washer of resilient material and a metal washer are mounted, the inner edge of the metal washer being curved on a radius to support the inner portion of the resilient washer in curved position so that one edge of the opening in the resilient washer rides in tight contact with the surface of the rotating member rotating therewithin.

A further object of the invention is to provide an oil seal in which the resilient washer is provided with sufficient thickness of material about the contacting edge as to firmly support the said edge in contact with the rotating member.

Another object of the invention is to provide an oil seal having a washer of resilient material provided with an opening therein of smaller diameter than the rotating member so that when the oil seal is fitted over said member the member turns the inner face of the washer outwardly allowing one edge of the washer opening to engage the rotating member, the oil seal being provided with an annular plate having a curved inner edge to support the resilient washer in the out-turned position.

These objects and the several novel features of the invention are hereinafter more fully described and claimed and the preferred form of construction by which these objects are attained is shown in the accompanying drawing in which Fig. 1 is a sectional view showing the oil seal in working position.

Fig. 2 is an enlarged section through the oil seal in the natural position.

Fig. 3 is a section through an alternative form of the oil seal in working position.

The oil seal is shown more particularly in Fig. 2 and comprises a sheet metal retainer 1 having a flange 2 on one side against which the resilient washer 3 is positioned. This washer 3 is formed of resilient material, such as leather, asbestos, cork, fiber, laminated fabric, or other suitable material, and is provided with a central opening. On the side opposite the flange 2 is a metal washer 4 having a lower edge 5 which is curved on a radius and this curved portion extends about the central opening in the metal washer 4. This washer 4 is positioned within the retainer 1 and the flange 6 of the retainer is turned over the edge of the washer 4 to firmly engage the resilient washer 3 and metal washer 4 between the flanges 2 and 6 of the retainer 1. The curved edge 5 of the metal washer 4 holds the inner edge of the resilient washer 3 in a curved position as shown in Fig. 2 with the edge 7 of the resilient washer forming the contact edge.

The assembled oil seal, shown in Fig. 2, is fitted into a member 8 shown in Fig. 1, the retainer 1 being fitted into a recess provided in the member 8 for this purpose. A shaft or rotating member 9 is then moved into position through the aperture of the resilient washer 3. As the aperture formed by the edge 7 is smaller in diameter than the rotating member inserted therethrough, the central opening in the washer is stretched causing the edge 7 of the resilient washer to engage the rotating member 9 in the manner shown in Fig. 3.

It will be noted that in this curved position shown in Figs. 2 and 3 that the edge 10 backs up or forms a support for the edge 7 to maintain it in firm contact with the outer surface of the rotating member. This gives an effect which is impossible with a washer having a tapered or beveled edge as there is no thickness or strength of material to back up the edge and consequently a thin edge of this type has a wabbly, loose and ineffective contact. With my device, the inner edge of the resilient washer is formed on a short radius and the inherent tendency of the resilient washer is to straighten itself out into the plane of the washer. This action produces a constant yielding tension urging the edge 7 into engagement with the cylindrical surface of the rotating member which is rotating therewithin. Even as the edge 7 wears, this tendency of the washer to straighten out maintains an effective seal between the edge of the washer and the rotating member.

An alternative form of the device is shown in Fig. 3. The oil seal shown in this figure is the same as that shown in Fig. 2 with the exception that the retainer 11 is wider than the retainer 1 and an annular member 12 having a flange 13 is positioned within the retainer. A packing 14 is mounted between the member 12 and the metal plate 4 and this packing may be of any standard type to pack the rotating member. In the form shown in Fig. 3, both the packing and resilient washer are held within the metal retainer 11 while in the form shown in Fig. 2 no packing is provided. It is to be noted that the rotating member may be removed or replaced as many times as desired without disturbing the sealing action of the resilient washer.

From the foregoing description it becomes evident that the device is very simple and efficient in operation, is composed of few parts and is of consequent low manufacturing cost, may be shipped as an assembled unit and provides a device which accomplishes the objects described.

Having thus fully described my invention, its utility and mode of operation, what I claim and desire to secure by Letters Patent of the United States is—

In an oil seal, a resilient washer having a central aperture, a metal washer having a central aperture of larger diameter than the central aperture of the resilient washer, the metal washer being provided with a curved out-turned edge about its central aperture and said out-turned edge engaging the resilient washer and turning the edge of the resilient washer outwardly, said metal washer extending about the outer radius of the curve of the resilient washer and maintaining and supporting the edge of the resilient washer about its aperture in curved position, the arrangement being such that a cylindrical rotary member inserted through the central aperture of the resilient washer will engage one edge of said washer at the aperture and the curved out-turned edge of the metal washer maintaining the other edge of the resilient washer at the aperture out of contact with said shaft.

THOMAS EDWARD NELSON.